(12) United States Patent
Lee

(10) Patent No.: US 11,625,065 B2
(45) Date of Patent: *Apr. 11, 2023

(54) DISPLAY APPARATUS

(71) Applicant: LG Display Co., Ltd., Seoul (KR)

(72) Inventor: JeongMan Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 273 days.

This patent is subject to a terminal disclaimer.

(21) Appl. No.: 16/887,185

(22) Filed: May 29, 2020

(65) Prior Publication Data

US 2020/0379508 A1 Dec. 3, 2020

(30) Foreign Application Priority Data

May 31, 2019 (KR) .......................... 10-2019-0064855

(51) Int. Cl.
*G06F 1/16* (2006.01)
*G10K 9/12* (2006.01)
*G06F 3/16* (2006.01)

(52) U.S. Cl.
CPC .............. *G06F 1/1605* (2013.01); *G06F 3/16* (2013.01); *G10K 9/12* (2013.01)

(58) Field of Classification Search
CPC .......... H04R 9/066; H04R 5/02; H04R 7/045; H04R 2499/15; G10K 9/22; G10K 9/12; G06F 3/16; G06F 1/1605; G06F 2200/1612
USPC ........................................................ 381/152
See application file for complete search history.

(56) References Cited

U.S. PATENT DOCUMENTS

| 2015/0036843 | A1 | 2/2015 | Nabata et al. | |
| 2018/0317000 | A1* | 11/2018 | Ham | H04R 1/2807 |
| 2018/0332376 | A1* | 11/2018 | Lee | H04R 9/022 |
| 2019/0208300 | A1* | 7/2019 | Lee | H04R 17/00 |
| 2020/0213699 | A1* | 7/2020 | You | H04R 17/00 |

FOREIGN PATENT DOCUMENTS

| CN | 201360305 Y | 12/2009 | |
| CN | 103338602 A | 10/2013 | |
| EP | 614314 A1 * | 9/1994 | H04N 5/642 |
| JP | 2019050517 A | 3/2019 | |

OTHER PUBLICATIONS

Office Action issued by the Chinese Patent Office corresponding to CN Application No. 202010474278.8, dated Dec. 17, 2021.

* cited by examiner

*Primary Examiner* — Melur Ramakrishnaiah
(74) *Attorney, Agent, or Firm* — Morgan, Lewis & Bockius LLP

(57) ABSTRACT

A display apparatus is disclosed, which includes a display panel including a first area and a second area, a first rear cover disposed below a rear surface of the display panel, a first sound generating module arranged in the first area to adjoining the display panel, and a second sound generating module arranged in the second area to be spaced apart from the display panel, wherein the first rear cover includes a first rear cover port hole formed to overlap the second sound generating module, the second sound generating module includes an enclosure disposed below a rear surface of the first rear cover and coupled with the first rear cover, and a second sound generating unit mounted in the enclosure, and the enclosure includes an enclosure port hole overlapped with the first rear cover port hole.

20 Claims, 15 Drawing Sheets

DISPLAY APPARATUS

CROSS-REFERENCE TO RELATED APPLICATIONS

This application claims the benefit of the Korean Patent Application No. 10-2019-0064855 filed on May 31, 2019 which is hereby incorporated by reference as if fully set forth herein.

TECHNICAL FIELD

The present disclosure relates to a display apparatus, and more particularly, to a display apparatus comprising a display panel outputting a sound.

DISCUSSION OF THE RELATED ART

Generally, a display apparatus is used as a screen built in electronic devices or home appliances, such as a television, a monitor, a notebook computer, a smart phone, a tablet computer, an electronic pad, a wearable device, a watch phone, a portable information device, a navigator and a vehicle control display device, to display images.

A general display apparatus may include a display panel for displaying images, and a sound device for outputting a sound related to an image.

However, a general display apparatus has a problem in that sound quality is deteriorated due to interference between sounds reflected from a wall or the ground as a sound output from a sound device progresses toward a rear direction or a lower direction of a display panel. For this reason, problems occur in that it is difficult to enable exact sound transfer and immersion of a viewer is deteriorated.

SUMMARY

The inventors of the present disclosure have recognized problems of a general display apparatus and carried out various experiments that may improve sound quality by implementing a progress direction of a sound toward a front direction of a display panel when a user views images at the front of the display panel. The inventors of the present disclosure have invented a display apparatus of a new structure, which may generate a sound capable of being progressed toward a front direction of the display panel and additionally improve sound quality of a low sound range, through various experiments.

Accordingly, embodiments of the present disclosure are directed to a display apparatus that substantially obviates one or more of the problems due to limitations and disadvantages of the related art.

An object of the present disclosure is to provide a display apparatus that enables exact sound transfer.

Another object of the present disclosure is to provide a display apparatus that may improve sound quality and increase a viewer's immersion.

Another object of the present disclosure is to provide a display apparatus that may generate a sound capable of being progressed toward a front direction of a display panel and additionally improve sound quality of a low sound range.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a display apparatus comprises a display panel including a first area and a second area, a first rear cover disposed below a rear surface of the display panel, a first sound generating module arranged in the first area to adjoining the display panel, and a second sound generating module arranged in the second area to be spaced apart from the display panel, wherein the first rear cover includes a first rear cover port hole formed to overlap the second sound generating module, the second sound generating module includes an enclosure disposed below a rear surface of the first rear cover and coupled with the first rear cover, and a second sound generating unit mounted in the enclosure, and the enclosure includes an enclosure port hole overlapped with the first rear cover port hole.

Details of the other embodiments are included in the detailed description and drawings.

According to one embodiment of the present disclosure, a display apparatus that enables exact sound transfer may be provided, and a display apparatus that may improve sound quality and increase a viewer's immersion may be provided.

According to one embodiment of the present disclosure, a display apparatus that may output a sound to a front direction of a display panel and output an amplified sound to a rear direction of the display panel.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
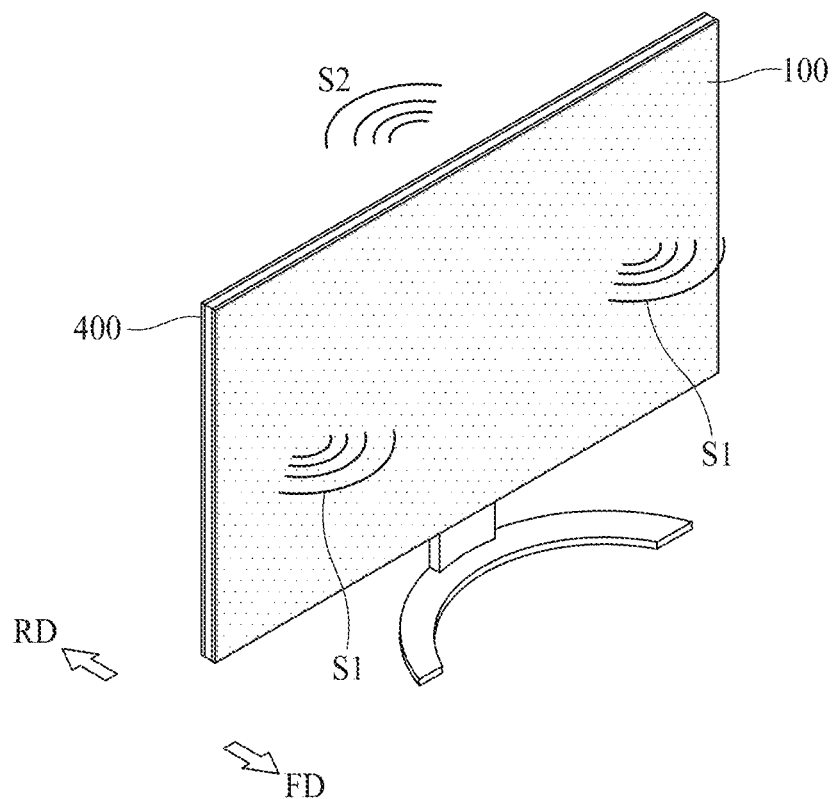
FIG. 1 is a view illustrating a display apparatus according to the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~', 'above~', 'below~', and 'next to~', one or more portions may be arranged between two other portions unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a display apparatus according to the present disclosure will be described in detail with reference to the accompanying drawings. Wherever possible, the same reference numbers will be used throughout the drawings to refer to the same or like parts. Since a scale of each of elements shown in the accompanying drawings is different from an actual scale for convenience of description, the present disclosure is not limited to the shown scale.

FIG. 1 is a view illustrating a display apparatus according to the present disclosure.

Referring to FIG. 1, the display apparatus according to the present disclosure may output sounds S1 and S2 in accordance with vibration of a display panel 100 for displaying images. For example, in the display apparatus, the display panel 100 may be vibrated by a sound generator (or vibration generator) according to one embodiment to generate the sound S1. The sound S1 generated in accordance with vibration of the display panel 100 may directly be output to a front direction FD of the display apparatus. Also, the display apparatus may output the sound S2 generated by vibration of the sound generator (or vibration generator) to a rear direction RD of the display panel 100. At this time, the sound S2 output to the rear direction RD of the display panel 100 may be a sound of a lower sound range than the sound S1 output to the front direction FD.

Figure 2A:
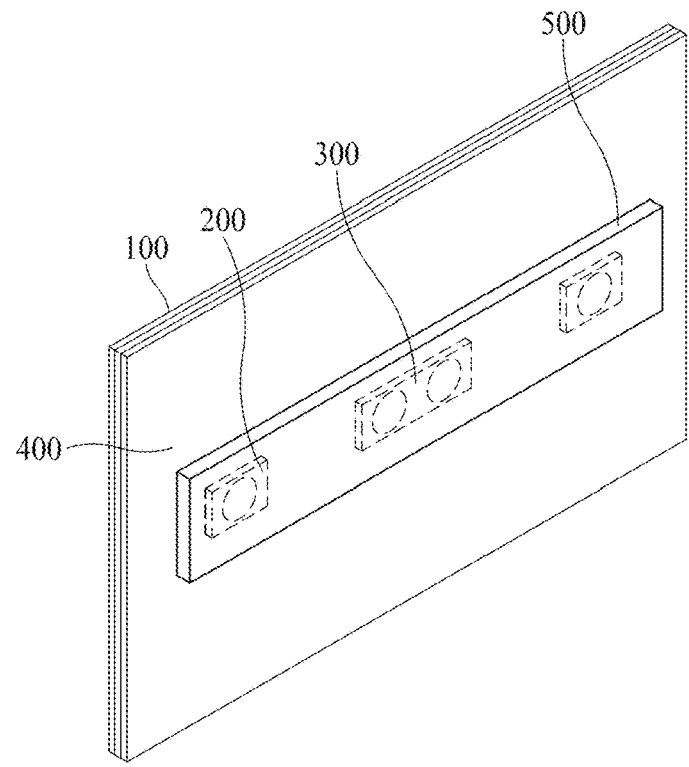
FIG. 2A illustrates a first sound generating module, a second sound generating module and a second rear cover, which are coupled with a first rear cover of a display apparatus shown in FIG. 1.
Figure 2B:
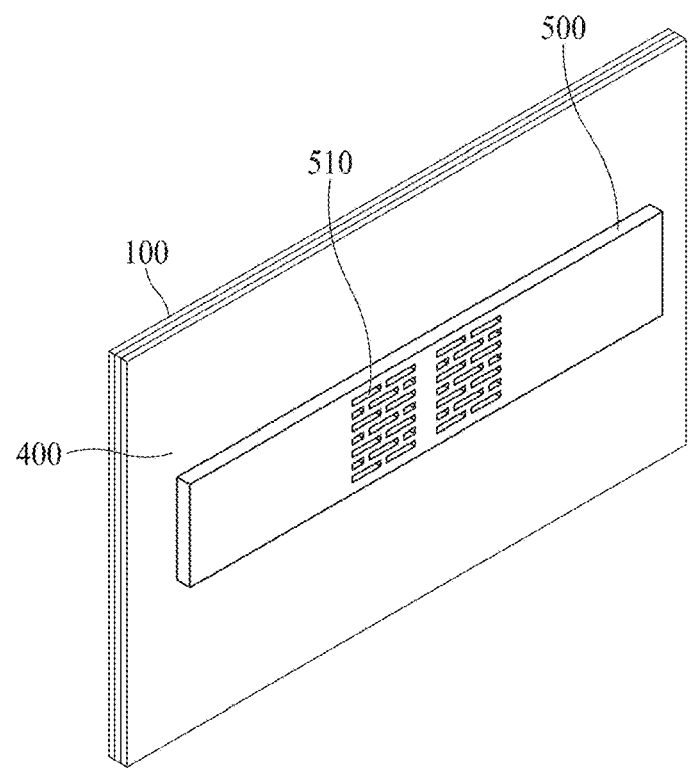
FIG. 2B illustrates a fine hole formed in a second rear cover of FIG. 2A.
Figure 3:
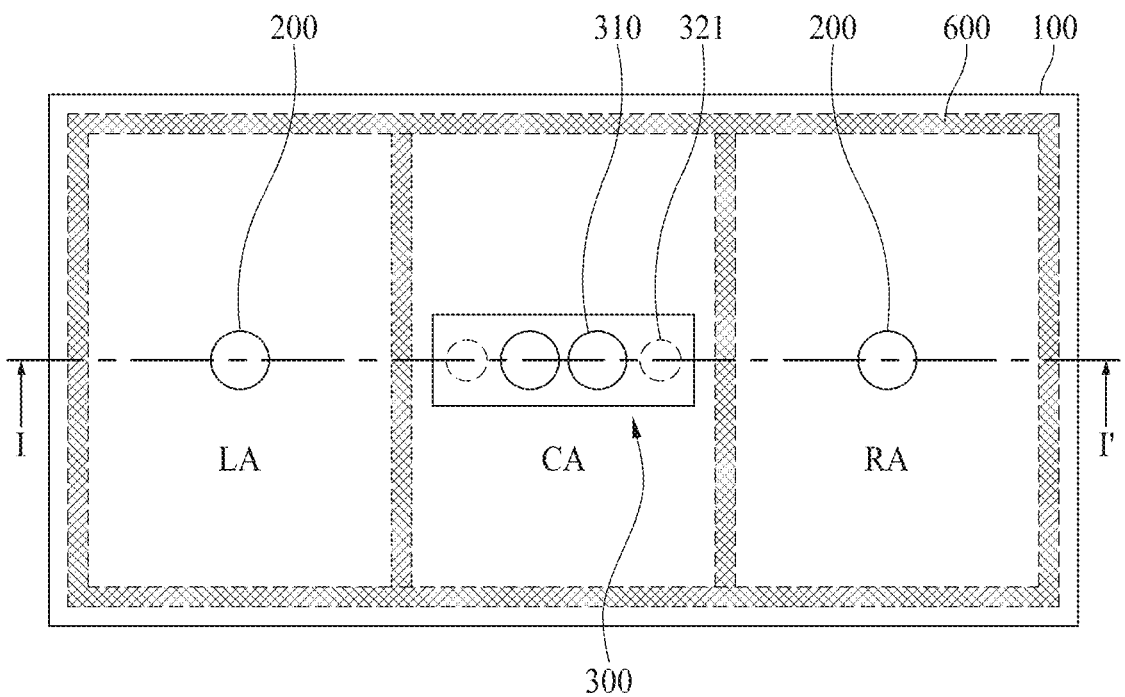
FIG. 3 is a rear plane view illustrating a display apparatus according to one embodiment of the present disclosure.
Figure 4:
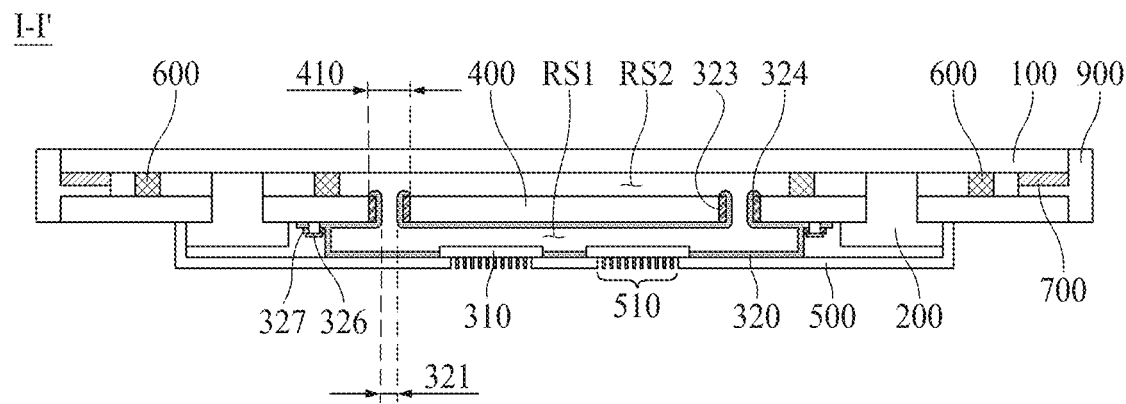
FIG. 4 is a cross-sectional view taken along line I-I' shown in FIG. 3.

FIG. 2A illustrates a first sound generating module, a second sound generating module and a second rear cover, which are coupled with a first rear cover of a display apparatus shown in FIG. 1, FIG. 2B illustrates a fine hole formed in a second rear cover of FIG. 2A, FIG. 3 is a rear plane view illustrating a display apparatus according to one embodiment of the present disclosure, and FIG. 4 is a cross-sectional view taken along line I-I' shown in FIG. 3.

Referring to FIGS. 2A to 4, the display apparatus according to the present disclosure may include a display panel 100, a first sound generating module 200, a second sound generating module 300, a first rear cover 400, a second rear cover 500, a partition member 600, an adhesive member 700, and a middle cabinet 900.

The display apparatus according to one embodiment of the present disclosure includes a display panel 100 that includes a first area and a second area, a first rear cover 400 arranged on a rear surface of the display panel 100, a first sound generating module 200 arranged in a first area and arranged to be adjacent to the display panel 100, and a second sound generating module 300 provided to be spaced apart from the display panel 100, wherein the first rear cover 400 includes a first rear cover port hole 410 formed to overlap the second sound generating module 300, the second sound generating module 300 includes an enclosure 320 arranged on a rear surface of the first rear cover 400 and coupled with the first rear cover 400, and a second sound generating unit 310 mounted in the enclosure 320, and the enclosure 320 includes an enclosure port hole 321 overlapped with the first rear cover port hole 410.

The display panel 100 may be all kinds of flat display panels or curved display panels such as a liquid crystal display panel, an organic light emitting display panel, a quantum dot light emitting display panel, a micro light emitting diode display panel, and an electroluminescent display panel. The display panel 100 is not limited to a specific display panel 100 that may be vibrated by a sound generator to generate sound waves or sounds.

The display panel 100 according to one embodiment may include a thin film transistor array substrate that includes a plurality of pixels defined by a plurality of gate lines and a plurality of data lines and a thin film transistor provided in each pixel to drive each pixel, an organic light emitting diode layer provided over the thin film transistor array substrate, and an encapsulation substrate overlaying the organic light emitting diode layer. The encapsulation substrate protects the thin film transistor and the organic light emitting diode layer from external impact, and prevents water from being permeated into the organic light emitting diode layer.

The display panel 100 according to the present disclosure may include a display area for displaying images, a non-display area surrounding the display area, and a bending area formed to overlap the display area and the non-display area, forming a curved surface at a side of the display panel, and the sound generating module may include a curved surface formed in the display area and the bending area and curved to correspond to the bending area. Therefore, the display apparatus according to another embodiment of the present disclosure may be a bendable display apparatus, and for example, may be, but not limited to, an edge bendable display apparatus.

The first rear cover 400 may fully overlay the rear surface of the display panel 100 by interposing a gap space. The first rear cover 400 may include at least one material of a glass material, a plastic material and a metal material. As an example, the first rear cover 400 of a glass material may be sapphire glass. As another example, the first rear cover 400 of a metal material may be made of any one of Al, Al alloy, Mg alloy, and alloy of Fe and Ni. As still another example, the first rear cover 400 may has a deposited structure of a glass plate and a metal plate relatively thinner than the glass plate and facing the rear surface of the display panel 100.

In the present disclosure, the first rear cover 400 may be expressed as another term such as housing, cover bottom, back cover, base frame, metal frame, metal chassis, chassis base or m-chassis. Therefore, the first rear cover 400 is a support structure for supporting the display panel 100, and may be embodied by all kinds of frames surrounding the rear surface of the display apparatus.

As shown in FIGS. 2A and 2B, the second rear cover 500 may accommodate the first sound generating module 200 and the second sound generating module 300, specifically may be arranged to overlay the rear surfaces of the first sound generating module 200 and the second sound generating module 300. Also, the second rear cover 500 may include a fine hole 510 formed to correspond to the second sound generating module 300. The fine hole 510 is a hole formed to pass through the second rear cover 500, and may provide a path through which a sound generated by a second sound generating unit 310 is output. Also, the second rear cover 500 may be coupled with the first rear cover 400 to rigidly fix the first sound generating module 200 and the second sound generating module 300 to the display apparatus. The second rear cover 500 may be referred to as another term such as a speaker bar.

The first sound generating module 200 may be fixed to the first rear cover 400 to directly vibrate the display panel 100. The first sound generating module 200 may be disposed behind the rear surface of the display panel 100 to directly vibrate the display panel 100, thereby outputting the sound to the front direction FD of the display panel 100. For example, since the first sound generating module 200 generates a sound by using the display panel 100 as a vibration panel, the first sound generating module 200 may be expressed as a sound generator. The first sound generating module 200 may generate a sound of middle and high sound ranges, wherein the middle sound range may be, but not limited to, 200 Hz to 3k Hz, and the high sound range may be, but not limited to, 3k Hz or more.

The first sound generating module 200 according to one embodiment may be in contact with the rear surface of the display panel 100 by passing through the first rear cover 400 to directly vibrate the display panel 100. An upper portion of the first sound generating module 200 may be inserted into a module insertion hole provided in the first rear cover and connected with the rear surface of the display panel 100, and a lower portion of the first sound generating module 200 may be in contact with and fixed to the rear surface of the first rear cover 400. Therefore, the first sound generating module 200 may be vibrated in accordance with a sound signal related to an image or a sound signal irrelevant to an image by using the first rear cover 400 as a support structure to vibrate the display panel 100, whereby the sound generated in accordance with vibration of the display panel 100 may directly be output to the front direction FD of the display panel 100.

The first sound generating module 200 according to one embodiment is a speaker, and may be, but not limited to, an actuator, an exciter, a transducer, or a piezoelectric element. The first sound generating module 200 may be a sound device for outputting the sound in accordance with an electric signal. The first sound generating module 200 according to one embodiment of the present disclosure will be described hereafter with reference to FIGS. 7A and 7B.

The second sound generating module 300 may include a second sound generating unit 310 and an enclosure 320. The second sound generating unit 310 may be fixed to the enclosure 320 and vibrate a first resonance space RS1 which is an inner space of the enclosure 320, to generate the sound and output the sound to the rear direction of the display panel. The second sound generating module 300 may generate a sound of a low sound range, which may be, but not limited to, 500 Hz or less. The second sound generating unit 310 may correspond to, but not limited to, a woofer.

The second sound generating module 300 according to one embodiment may include at least one second sound generating unit 310, and may be configured to include two sound generating units 310 as shown in FIG. 3.

A partition member 600 may be arranged between the display panel 100 and the first rear cover 400, and may surround each of the first sound generating module 200 and the second sound generating module 300 and split an area where each of the first sound generating module 200 and the second sound generating module 300 is arranged. Also, the partition member 600 may define an air gap or space where a sound is generated by the first sound generating module 200, and may positionally split the sound generated by the first sound generating module 200. The partition member 600 may be made of, but not limited to, polyurethane or polyolefin. Also, the partition member 600 may be made of one-sided tape, a double-sided tape, an adhesive or a bond, etc., or may be made of a material having elasticity to be compressed at a certain level.

According to one embodiment of the present disclosure, as shown in FIG. 3, a first area may be a left area LA and a right area RA of the display panel, and a second area may be a center area CA of the display panel, which is not overlapped with the first area. The partition member 600, as shown in FIG. 3, may partition the left area LA and the right area RA where the first sound generating module 200 is arranged, and the center area CA where the second sound generating module 300 is arranged. At this time, the first sound generating module 200 may generate a sound of middle and high sound ranges, and the second sound generating module 300 may generate a sound of a low sound range. In this case, the middle sound range may be, but not limited to, 200 Hz to 3k Hz, and the high sound range may be, but not limited to, 3k Hz or more, and the low sound range may be, but not limited to, 200 Hz or less.

Therefore, the display apparatus according to one embodiment of the present disclosure may output a stereo sound based on left and right sound split of the first sound generating module 200 and at the same time output a sound of a low sound range through the second sound generating module 300, thereby providing a sound output characteristic of 2.1 channel type.

In this case, the first sound generating module 200 may output a sound by vibrating the left area LA and the right area RA of the display panel 100, the second sound generating module 300 may generate a sound from the center area CA. The partition member 600 may prevent interference among sounds respectively generated from the center area, the left area and the right area of the display apparatus.

According to one embodiment, the plurality of the first sound generating module 200 and the second sound generating module 300 may be arranged in the same line. In this case, since sound sources generating sounds may have the same height or similar heights, when a reproduced stereo sound expressing a position of a sound through a difference between left and right sounds, sound image specify may be improved, in which a sound image is embodied in a right position.

Referring to FIG. 4, the display apparatus according to the present disclosure may include a display panel 100, a first sound generating module 200, a second sound generating module 300, a first rear cover 400, a second rear cover 500, a partition member 600, an adhesive member 700, and a middle cabinet 900. The second sound generating module 300 may include a second sound generating unit 310, an enclosure 320, an enclosure port hole 321, a coupling member 323, a coupling portion 324, a rubber ring 326, and a screw 327. The first rear cover 400 may include a first rear cover port hole 410 formed to correspond to the second sound generating module 300.

The enclosure 320 may be disposed below a rear surface of the first rear cover 400, and may be provided to be coupled with the first rear cover 400. In more detail, at least a portion of the enclosure 320 may be fixed to the first rear cover 400 through a coupling structure such as the rubber ring 326 and the screw 327. Also, the coupling portion 324 formed to correspond to the first rear cover port hole 410 may be coupled to the first rear cover port hole 410 together with the coupling member 323. At this time, the coupling member 323 may be made of, but not limited to, polyurethane or polyolefin. Also, the coupling member 323 may be made of one-sided tape, a double-sided tape, an adhesive or a bond, etc., or may be made of a material having elasticity to be compressed at a certain level.

The first resonance space RS1 may be defined as an inner space of the enclosure 320, and may be defined as a space where a sound of the second sound generating module 300 is amplified. Alternatively, the first resonance space RS1 may be defined as a space surrounded by the enclosure 320. In more detail, a capacity of the first resonance space may be defined as an inner space sealed by the second sound generating unit 310 and the enclosure 320 when the enclosure port hole 321 is not formed. According to one embodiment, the capacity of the first resonance space RS1 may be, but not limited to, 50 cc to 150 cc, and may be changed in accordance with a design of the display apparatus.

The second resonance space RS2 is an area between the display panel 100 and the first rear cover 400, and may be defined as an area corresponding to the second area. Alternatively, the second resonance space RS2 is an area corresponding to the second sound generating module in the area between the display panel 100 and the first rear cover 400 when the first rear cover port hole 410 is not formed, and may be defined as an area partitioned by the partition member 600. According to one embodiment, a capacity of the second resonance space RS2 may be, but not limited to, 150 cc to 300 cc, and may be changed in accordance with a design of the display apparatus.

The display apparatus according to one embodiment of the present disclosure may include a first rear cover port hole 410 and an enclosure port hole 321 overlapped with the first rear cover port hole 410, whereby the first rear cover port hole 410 and the enclosure port hole 321 may be formed to communicate the first resonance space RS1 with the second resonance space RS2. In this way, as the first resonance space RS1 and the second resonance space RS2 are connected with each other, the sound generated by the second sound generating module 300 may be amplified, and reproducing characteristic of a low sound range having improved pitch and sound pressure may be obtained. According to one embodiment of the present disclosure, the first rear cover port hole 410 and the enclosure port hole 321 may be formed by at least one port hole to correspond to the second area.

The adhesive member 700, as shown in FIG. 4, may be arranged at an edge of the display panel 100, and attaches the display panel 100 with the middle cabinet 900. The adhesive member 700 may be, but not limited to, a double-sided tape or a single-sided tape.

The middle cabinet 900 may be formed at edges of the display panel 100 and the first rear cover 400 to surround each side of the display panel 100 and the first rear cover 400.

Figure 5A:
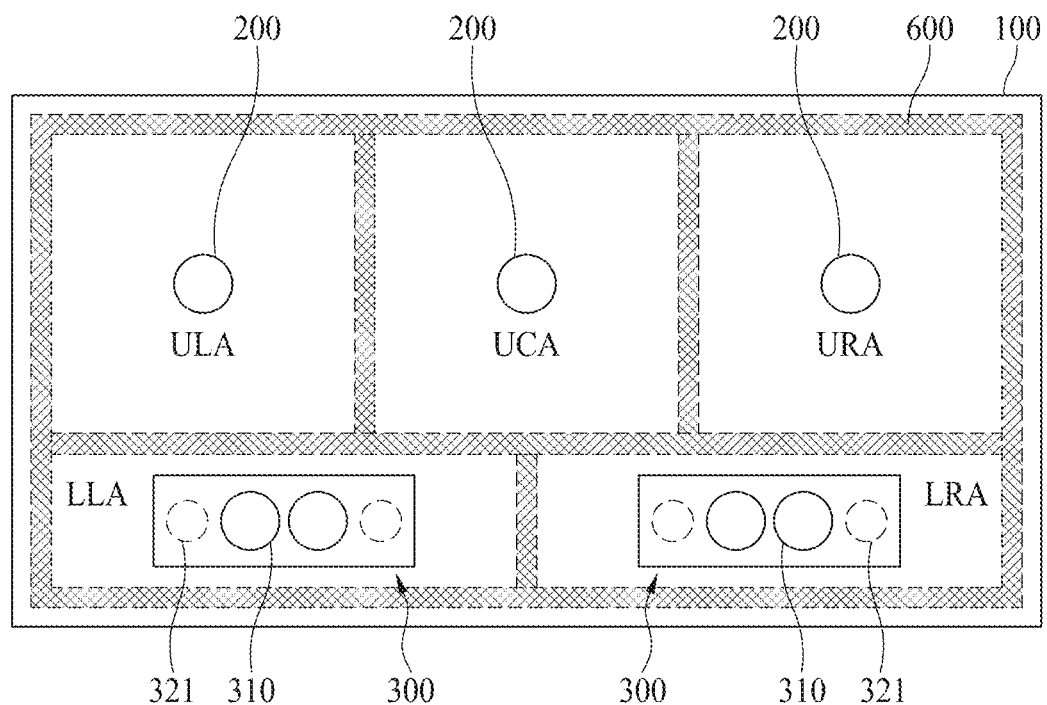
FIGS. 5A and 5B are rear views illustrating a display apparatus according to one embodiment of the present disclosure.
Figure 5B:
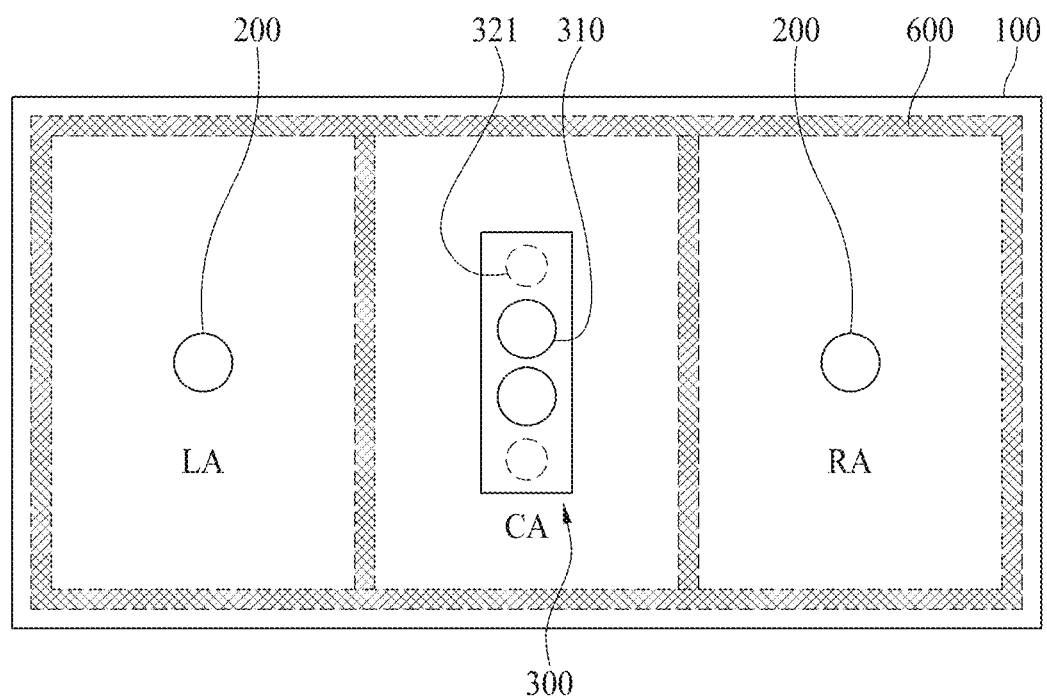

FIGS. 5A and 5B are rear views illustrating a display apparatus according to one embodiment of the present disclosure.

Referring to FIG. 5A, the first area may be an upper area of the display panel, and the second area may be a lower area of the display area, which is not overlapped with the first area. Also, the upper area may include first to third upper areas, and the lower area may include first and second lower areas. In this case, the first upper area may be an upper left area ULA where the first sound generating module 200 may be arranged, the second upper area may be an upper center area UCA where the first sound generating module 200 may be arranged, and the third upper area may be an upper right area URA where the first sound generating module 200 may be arranged. Further, the first lower area may be an lower left area LLA where the second sound generating module 300 may be arranged, and the second lower area may be an lower right area LRA where the second sound generating module 300 may be arranged. Therefore, the display apparatus according to one embodiment of the present disclosure may output 3.2 channels sound characteristic.

Referring to FIG. 5B, a first area may be a left area LA and a right area RA of the display panel, and a second area may be a center area CA of the display panel, which is not overlapped with the first area. The partition member 600, as shown in FIG. 5B, may partition the left area LA and the right area RA where the first sound generating module 200 is arranged, and the center area CA where the second sound generating module 300 is arranged. At this time, the first sound generating module 200 may generate a sound of middle and high sound ranges, and the second sound generating module 300 may generate a sound of a low sound range. In this case, the middle sound range may be, but not limited to, 200 Hz to 3k Hz, and the high sound range may be, but not limited to, 3k Hz or more, and the low sound range may be, but not limited to, 200 Hz or less. The display apparatus of FIG. 5B has the same configuration as the display apparatus of FIG. 3 except that the second sound generating module 300 arranged in vertical wise.

Figure 6A:
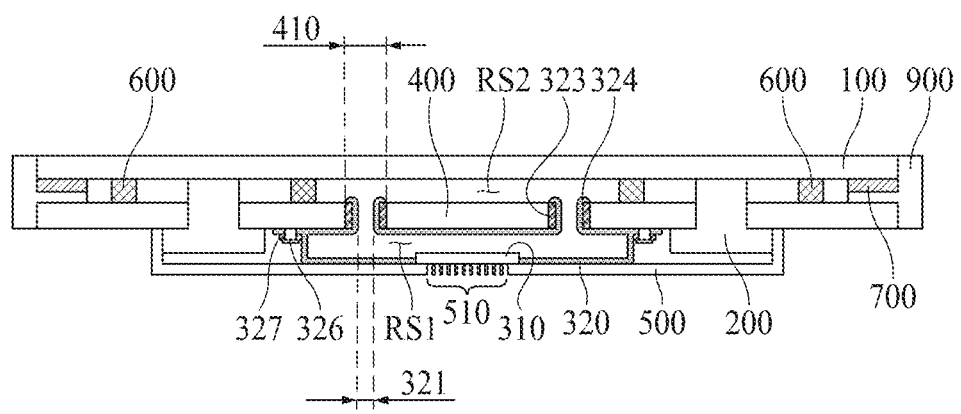
FIGS. 6A and 6B are cross-sectional views illustrating a display apparatus according to one embodiment of the present disclosure.
Figure 6B:
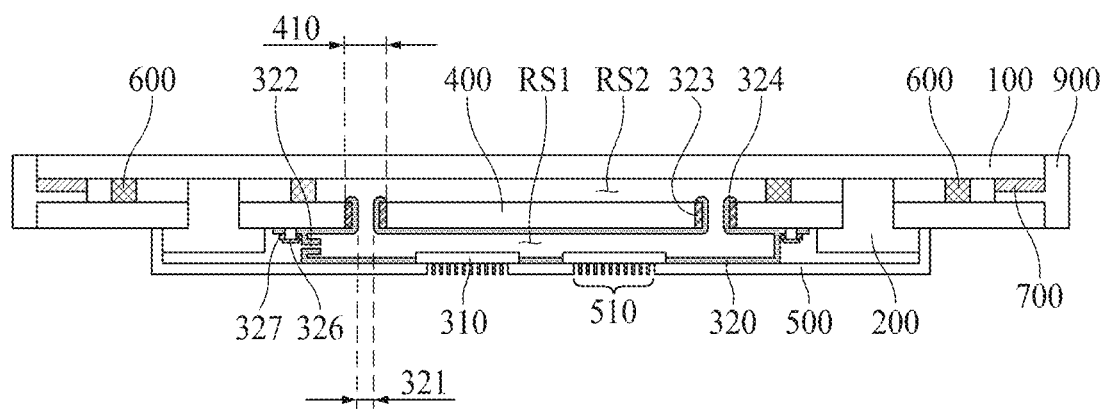

FIGS. 6A and 6B are cross-sectional views illustrating a display apparatus according to one embodiment of the present disclosure.

It is noted from the display apparatus shown in FIG. 6A that the second sound generating unit 310 of the second sound generating module 300 is provided as one unit. In this way, the second sound generating unit 310 may be provided to be modified in various shapes in accordance with a design of the display apparatus without limitation to the number of units. Also, although not shown, the enclosure port hole 321 and the first rear cover port hole 410 corresponding to the enclosure port hole 321 may be provided in various shapes and combinations for sound characteristics of the second sound generating module.

It is noted from the display apparatus shown in FIG. 6B that a enclosure duct 322 is formed at at least one side of the enclosure 320. In this way, the duct 322 may be formed at at least one side of the enclosure, and may provide an additional path for outputting a sound generated by the second sound generating module 300.

Figure 7A:
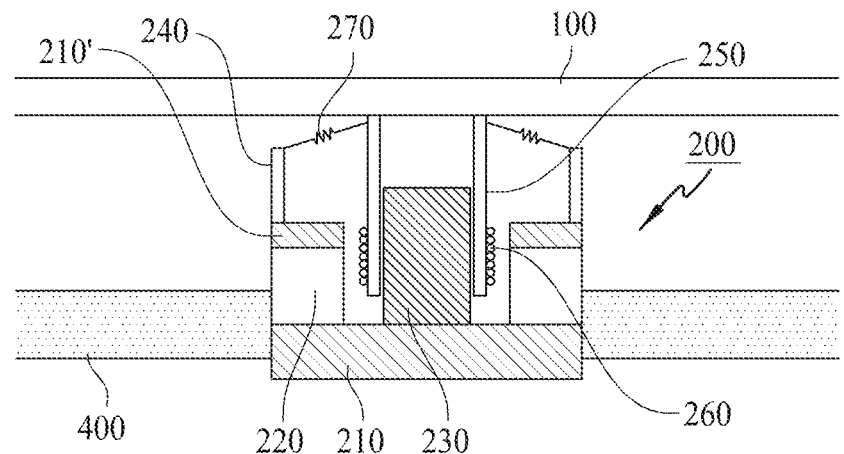
FIGS. 7A and 7B are cross-sectional views illustrating a first sound generating module according to one embodiment of the present disclosure.
Figure 7B:
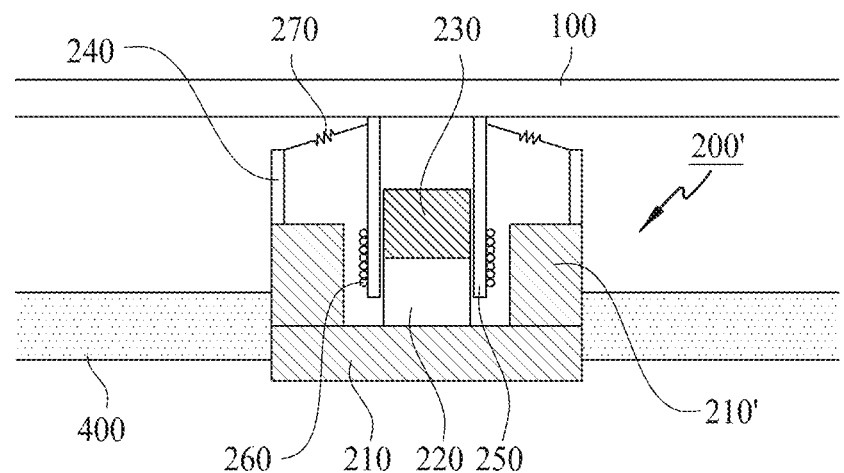

FIGS. 7A and 7B are cross-sectional views illustrating a first sound generating module according to one embodiment of the present disclosure.

The first sound generating module 200 may be categorized into a first structure in which a magnet is arranged outside a coil, and a second structure in which a magnet is arranged inside a coil. The first structure may be expressed as a dynamic type or an external magnetic type. The second structure may be expressed as a micro type or an internal magnetic type.

FIG. 7A illustrates the first structure, and FIG. 7B illustrates the second structure.

Referring to FIG. 7A, the first sound generating module 200 may include plates 210 and 210', a magnet 220 over the plates, a center pole 230 over the plates, a bobbin 250 arranged around the center pole 230, and a coil 260 wound outside the bobbin 250.

For example, the magnet 220 is provided over the first plate 210, and the second plate 210' is provided over the magnet 220. The first plate 210 and the second plate 210' may fix the first sound generating module 200 to first rear cover 400 while supporting the magnet 220. Therefore, the first plate 210 may be fixed to a support hole formed in the first rear cover 400, and the magnet 220 arranged between the first plate 210 and the second plate 210' may fixedly be supported.

At least one of the first plate 210 and the second plate 210' may be made of a material having magnetism such as Fe. The plate may be expressed as another term such as yoke.

A sintering magnet such as barium ferrite may be used as the magnet 220. The magnet 220 may be made of, but not limited to, an alloy cast magnet of $Fe_2O_3$, $BaCO_3$, Nd magnet, strontium ferrite having an improved magnetic component, Al, Ni, and Co. The Nd magnet may be Nd-Fe-B, for example.

A frame 240 is arranged over the second plate 210' while existing at an outside portion of the first plate 210. A center pole 230 is arranged over a center area of the first plate 210. The center pole 230 and the first plate 210 may be formed in a single body. The center pole 230 may be referred to as pole pieces. Alternatively, pole pieces may further be arranged over the center pole 230.

The bobbin surrounding the center pole 230 is arranged. The coil 260 is wound around a lower portion of the bobbin 250, and a current for sound generation is applied to the coil 260.

The bobbin 250 may be a ring shaped structure formed of paper or Al sheet, and the coil 260 may be wound around a lower portion of the bobbin 250. The bobbin 250 and the coil 260 may be expressed as a voice coil.

A damper 270 may be arranged between an upper portion of the bobbin 250 and the frame 240. The damper may be expressed as another term such as an edge.

FIG. 7B illustrates a second structure in which a magnet is arranged inside a coil.

Referring to FIG. 7B, a first sound generating module 200' of the second structure may include the magnet 220 over the first plate 210, the center pole 230 over the magnet 220, the bobbin 250 arranged around the magnet 220 and the center pole 230, and the coil wound around the bobbin 250.

For example, the first plate 210 may be fixed to the support hole formed in the first rear cover 400. The magnet 220 is arranged over the first plate 210, and the center pole 230 is arranged over the magnet 220. The center pole may be referred to as pole pieces. Alternatively, the pole pieces may further be arranged over the center pole 230.

The bobbin 250 is arranged to surrounding the magnet 220 and the center pole 230, and the coil 260 is wound outside the bobbin 250.

The second plate 210' is arranged near the outside portion of the first plate 210, and the frame 240 is arranged at an outside portion of the second plate 210'. The damper 270 is arranged between the frame 240 and the bobbin.

The first sound generating module of the second structure has advantages in that leakage flux is smaller than that of the first structure in which the magnet is arranged outside the coil, and an overall size may be more reduced than that of the first structure.

The first sound generating module used in the display apparatus according to the embodiment of the present disclosure is not limited to the structures shown in FIGS. 7A and 7B, and another type of first sound generating module that may generate a sound by vibrating the display panel may be used.

Although not shown in FIGS. 7A and 7B the first sound generating module 200 may further include a fastening structure, such as nut, pem nut, screw, and screw through hole, for being coupled to the first rear cover 400.

FIGS. 8A to 8D are views illustrating a second sound generating module according to one embodiment of the present disclosure.

Figure 8A:
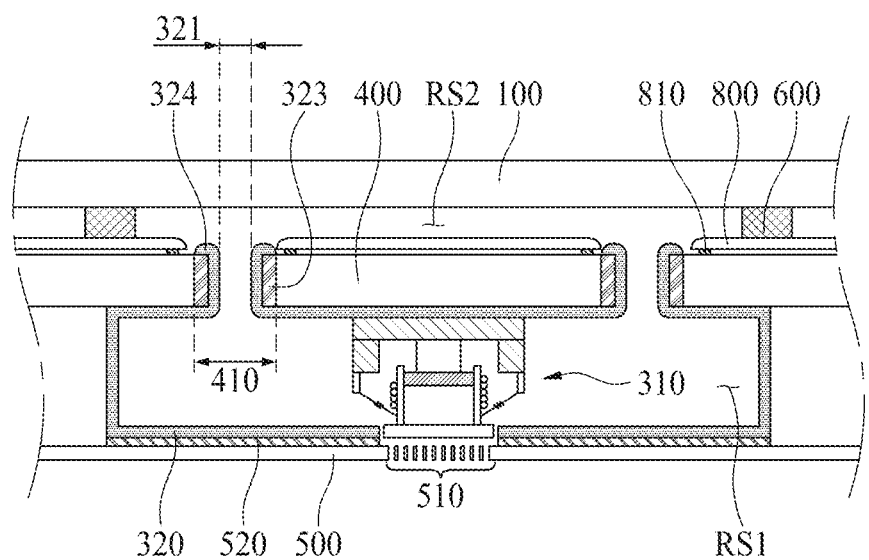
FIGS. 8A to 8D are views illustrating a second sound generating module according to one embodiment of the present disclosure.

Referring to FIG. 8A, it is noted that the second sound generating unit 310 has a similar structure to that of the first sound generating module 200 of FIGS. 7A and 7B but is provided reversely. However, the second sound generating unit 310 is not limited to the shown shape, and a structure for outputting a sound of a predetermined low sound range may be used for the second sound generating unit 310 without limitation.

The second sound generating unit 310 may be provided with a separate vibration panel without using the display panel 100 as a vibration panel, and a sound of a low sound range may be output to an upper portion or a lower portion of the second sound generating unit 310 based on the vibration panel in accordance with vibration of the vibration panel. The sound of the low sound range, which is generated toward the upper portion of the second sound generating unit 310, may be output through the fine hole 510, and the sound of the low sound range, which is generated toward the lower portion of the second sound generating unit 310, may be amplified by the first resonance space RS1 and the second resonance space RS2 and then output through the fine hole 510.

According to one embodiment of the present disclosure, the second rear cover 500 may further include a second buffering member 520 formed to correspond to the area which is in contact with the enclosure 320. The second buffering member 520 may prevent unwanted vibration from being generated by fixing the second rear cover 500 and the enclosure 320. The second buffering member 520 may be made of a foam having elasticity. For example, the second buffering member 520 may be made of, but not limited to, polyurethane, polyolefin or polyethylene. Also, the second buffering member 520 may be made of, but not limited to, one-sided tape, a double-sided tape, an adhesive or a bond, etc.

The display apparatus according to one embodiment of the present disclosure may further include a support member 800. The support member 800 may be disposed above the first rear cover 400, and is arranged to be more adjacent to the display panel 100 than the first rear cover 400. The support member 800 may reinforce rigidity of the first rear cover 400 and the display panel 100, and may perform a heat emission function.

According to one embodiment of the present disclosure, the display apparatus may further include a third buffering member 810 arranged between the first rear cover 400 and the support member 800. The third buffering member 810 may prevent the sound generated by the second sound generating module 300 from leaking between the first rear cover 400 and the support member 800.

The third buffering member 810 may be made of a foam having elasticity. For example, the third buffering member 810 may be made of, but not limited to, polyurethane, polyolefin or polyethylene. Also, the third buffering member 810 may be made of, but not limited to, one-sided tape, a double-sided tape, an adhesive or a bond, etc.

Also, according to another embodiment of the present disclosure, as shown in FIG. 8A, the partition member 600 may be arranged between the display panel 100 and the support member 800.

Figure 8B:
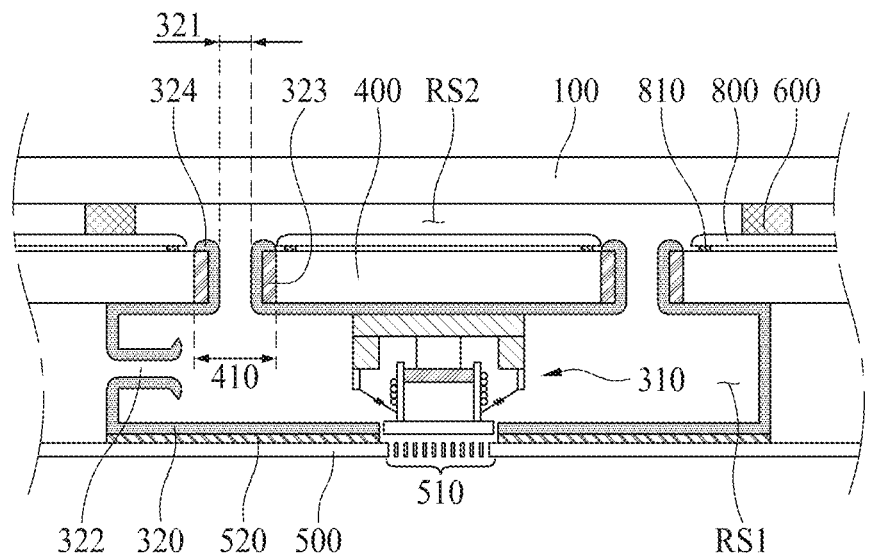

It is noted from the display apparatus according to one embodiment of FIG. 8B that the duct 322 is formed at one side of the enclosure 320 of the second sound generating module 300. The duct 322 may provide an additional path for outputting the sound generated by the second sound generating module 300.

The display apparatus according to one embodiment of FIG. 8C may include a first buffering member 325 formed below the rear surface of the first rear cover 400 to correspond to the second sound generating unit 310. It is noted that the first buffering member 325 is formed at one side adjacent to the second sound generating unit 310. The first buffering member 325 may be formed to replace a portion of the enclosure 320 corresponding to the second sound generating unit 310, for design of a slim type second sound generating module 300, and may prevent the sound from leaking between the first rear cover 400 and the enclosure 320. Also, although not shown, for additional slim design of the second sound generating module 300, the second sound generating unit 310 may be provided to be inserted into a recess formed in the first rear cover 400.

The first buffering member 325 may be made of a foam having elasticity. For example, the first buffering member 325 may be made of, but not limited to, polyurethane, polyolefin or polyethylene. Also, the first buffering member 325 may be made of, but not limited to, one-sided tape, a double-sided tape, an adhesive or a bond, etc.

Figure 8C:
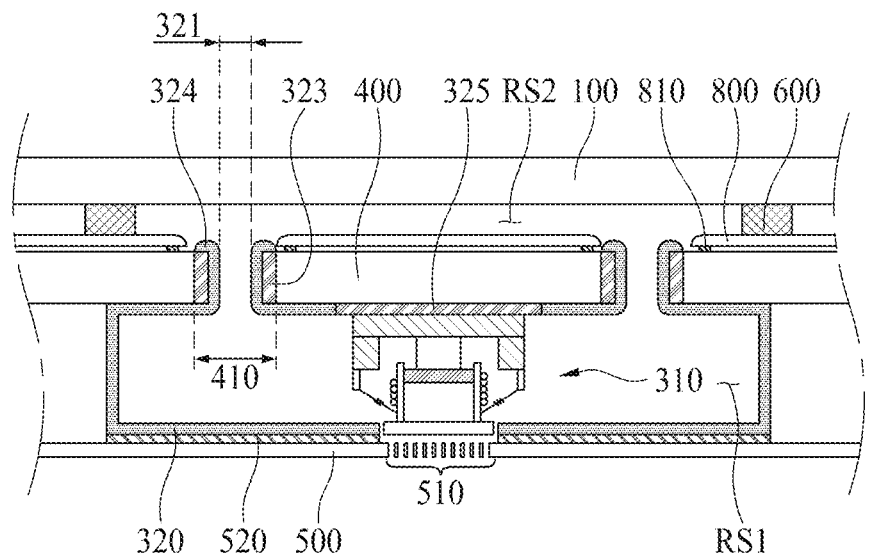
Figure 8D:
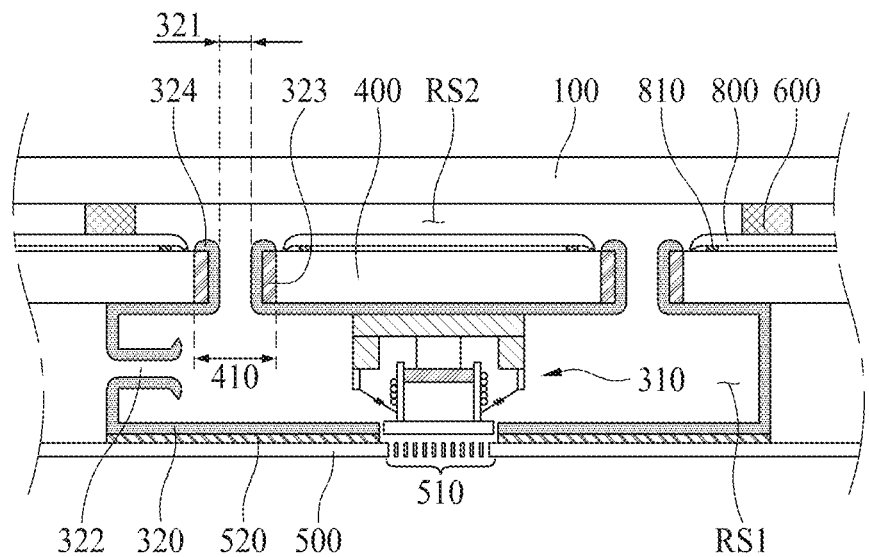

The display apparatus according to one embodiment of FIG. 8D may be provided such that coining process is performed for edges of the support member 800 and therefore a side edge of the support member 800 is closely attached to the first rear cover 400. As shown in FIG. 8D, coining may be performed for the support member 800, whereby the sound generated by the second sound generating module 300 may be prevented from leaking between the first rear cover 400 and the support member 800.

Figure 9:
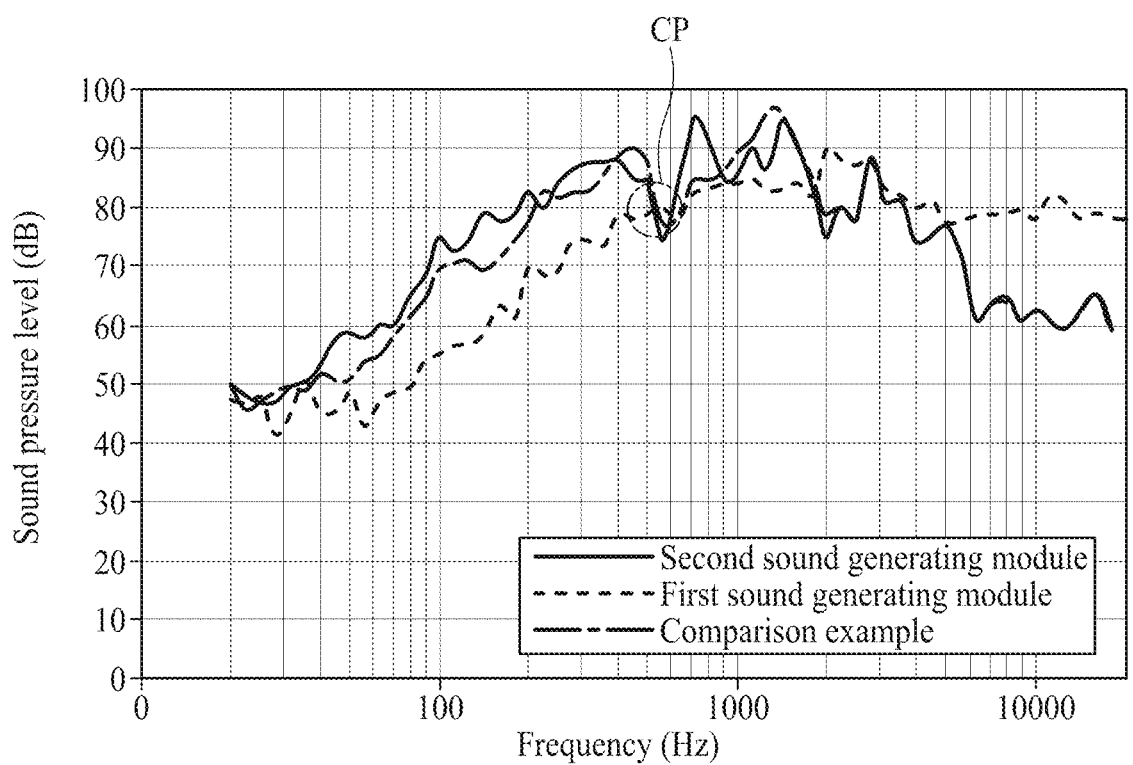
FIG. 9 is a graph illustrating frequency-sound pressure characteristics of a first sound generating module and a second sound generating module of a display apparatus according to an embodiment of the present disclosure and a sound generating module according to a comparison example.

FIG. 9 is a graph illustrating frequency-sound pressure characteristics of a first sound generating module and a second sound generating module of a display apparatus according to an embodiment of the present disclosure and a sound generating module according to a comparison example. In FIG. 9, a horizontal axis denotes a frequency Hz, and a vertical axis denotes a sound pressure level (SPL) dB.

In FIG. 9, measurement has been performed at a center portion of the display panel by a sound analysis equipment. The sound analysis equipment may include a sound card for transmitting and receiving a sound with a control PC, an amplifier amplifying the sound generated from the sound card and transferring the amplified sound to the sound generating module, and a microphone collecting sounds generated from the display panel through the sound generating module. The sounds collected in the microphone are input to the control PC through the sound card and then identified by a control program, whereby the sounds of the sound generating module are analyzed.

A measurement value shown by a solid line in FIG. 9 illustrates frequency-sound pressure characteristics of the second sound generating module to which the structure of FIG. 8C is applied, a measurement value shown by a dotted line in FIG. 9 illustrates frequency-sound pressure characteristics of the first sound generating module shown in FIG. 4, and a measurement value shown by a dashed dotted line in FIG. 9 illustrates frequency-sound pressure characteristics of a sound generating module in which the enclosure port hole 321 and the first rear cover port hole 410 are not formed in the structure of FIG. 8C.

As shown in FIG. 9, it is noted that the frequency-sound pressure characteristic of the first sound generating module, which is shown by a dotted line, is higher at a sound range of 2000 Hz or more, than the second sound generating module and the sound generating module of the comparison example. It is noted that the frequency-sound pressure characteristic of the second sound generating module 300, which is shown by a solid line, is remarkably higher at an area of a crossing point CP of 600 Hz or less, than the first sound generating module. Finally, the frequency-sound pressure characteristics of the second sound generating module 300 and the sound generating module of the comparison example are generally high at a frequency of 400 Hz or less.

Referring to experimental results of FIG. 9, it is noted from the frequency-sound pressure characteristic measured of the second sound generating module 300 of the present disclosure that a low sound output characteristic is improved by increase of a resonance space where a low sound generated by the second sound generating module 300 may be resonated or amplified as the first resonance space RS1 and the second resonance space RS2 are formed to be communicated with each other, as described above.

Figure 10A:
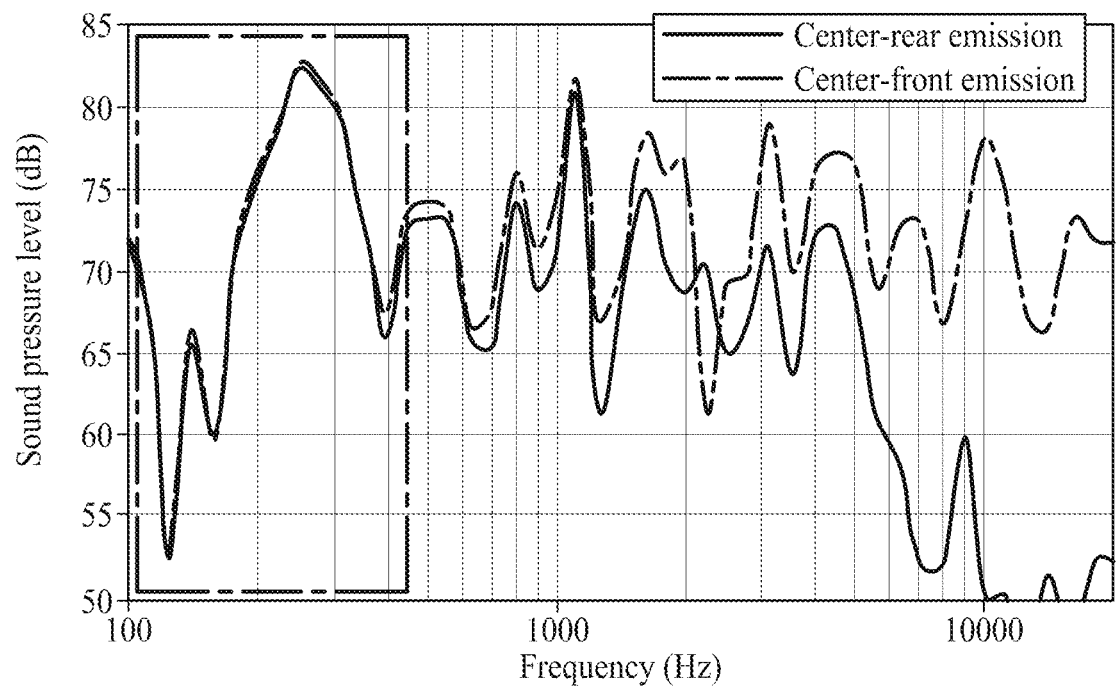
FIGS. 10A to 10C are graphs illustrating frequency-sound pressure characteristics according to experimental examples.
Figure 10B:
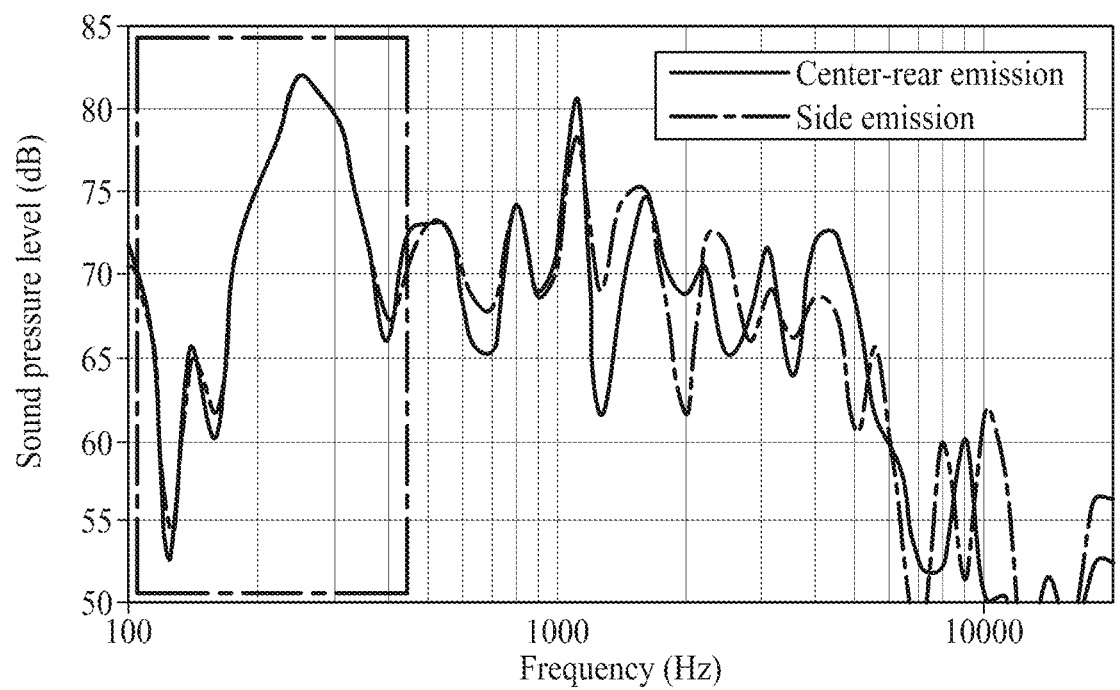
Figure 10C:
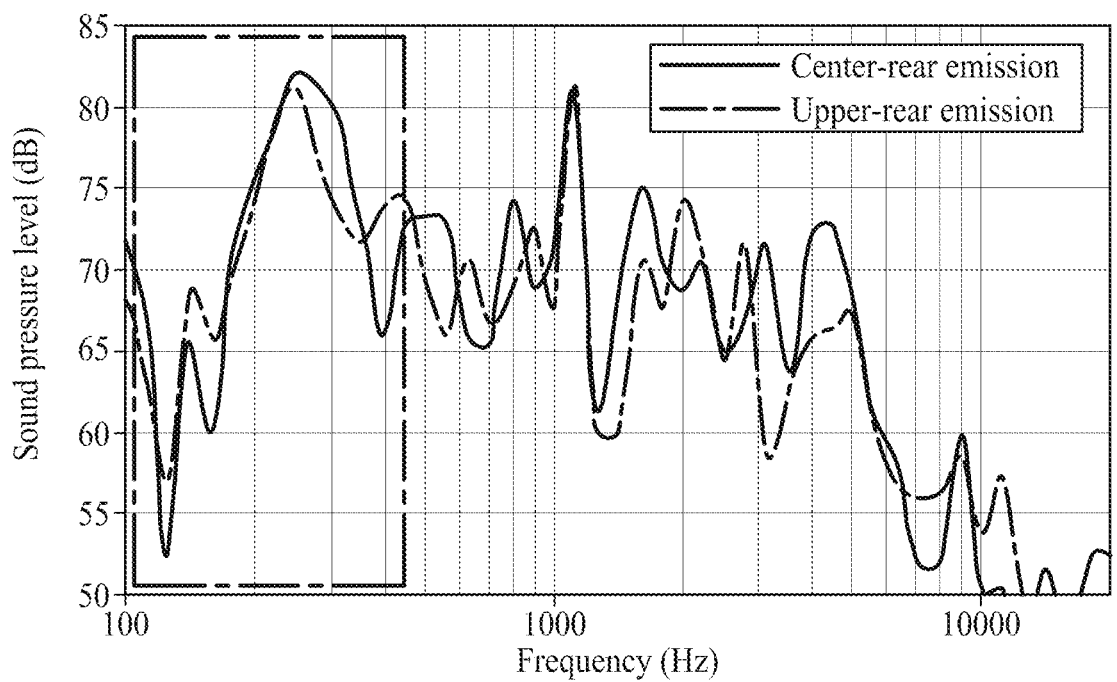

FIGS. 10A to 10C are graphs illustrating frequency-sound pressure characteristics according to experimental examples. In FIG. 10A to 10C, a horizontal axis denotes a frequency Hz, and a vertical axis denotes a sound pressure level (SPL) dB.

The experimental examples in FIGS. 10A to 10C illustrate frequency-sound pressure characteristics measured on the condition of an anechoic chamber having no reflection of a sound, wherein the frequency-sound pressure characteristics are measured through emission from a center to a front surface of the display panel, emission from the center to a rear surface of the display panel, emission to the rear surface by spacing 40 cm from the center to an upper portion of the display panel and emission to a side by spacing 40 cm from the center to the side of the display panel after setting a virtual TV position, by using a full range speaker built in a 65-inch TV (model No. LGE65UH6550) for experiments. Since measurement conditions of FIGS. 10A to 10C are the same as those described in FIG. 9, additional description will be omitted to avoid repeated description.

In FIG. 10A, a solid line denotes emission (hereinafter, referred to as 'center-rear emission') from the center to the rear surface of the display panel, and a dashed dotted line denotes emission (hereinafter, referred to as 'center-front emission') from the center to the front surface of the display panel. As shown in FIG. 10A, it is noted that there is no big difference between the center-front emission and the center-rear emission at sound characteristics of 500 Hz or less shown in a box and that the center-front emission indicates a more improved result than the center-rear emission in a sound pressure measurement value of 500 Hz or more.

In FIG. 10B, a solid line denotes a frequency-sound pressure characteristic of the center-rear emission, and a dashed dotted line denotes a measured result through emission (hereinafter, referred to as 'side emission') by spacing 40 cm from the center to the side of the display panel as described above. As shown in FIG. 10B, substantial sound characteristics differences including a sound characteristic of 500 Hz or less shown in a box cannot be observed in case of the center-rear emission and the side emission.

In FIG. 10C, a solid line denotes a frequency-sound pressure characteristic of the center-rear emission, and a dashed dotted line denotes a measured result through emission (hereinafter, referred to as 'upper-rear emission') to a rear surface by spacing 40 cm from the center to the upper portion of the display panel as described above. As shown in FIG. 10C, substantial sound characteristics differences including a sound characteristic of 500 Hz or less shown in a box cannot be observed in case of the center-rear emission and the upper-rear emission.

Figure 11A:
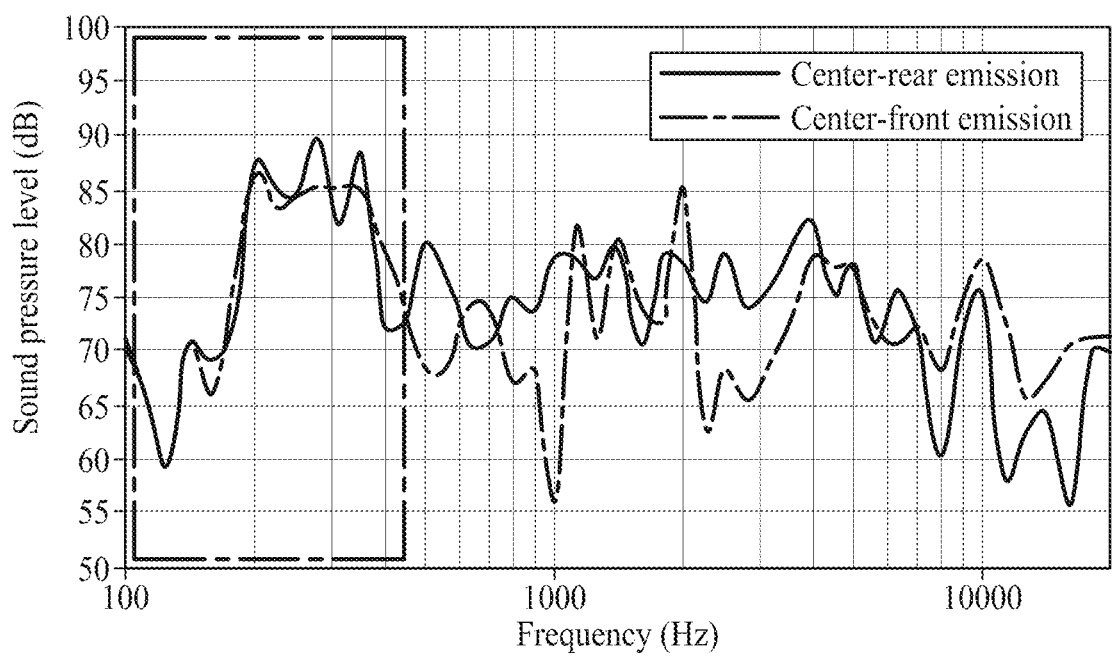
FIGS. 11A to 11C are graphs illustrating frequency-sound pressure characteristics according to experimental examples.
Figure 11B:
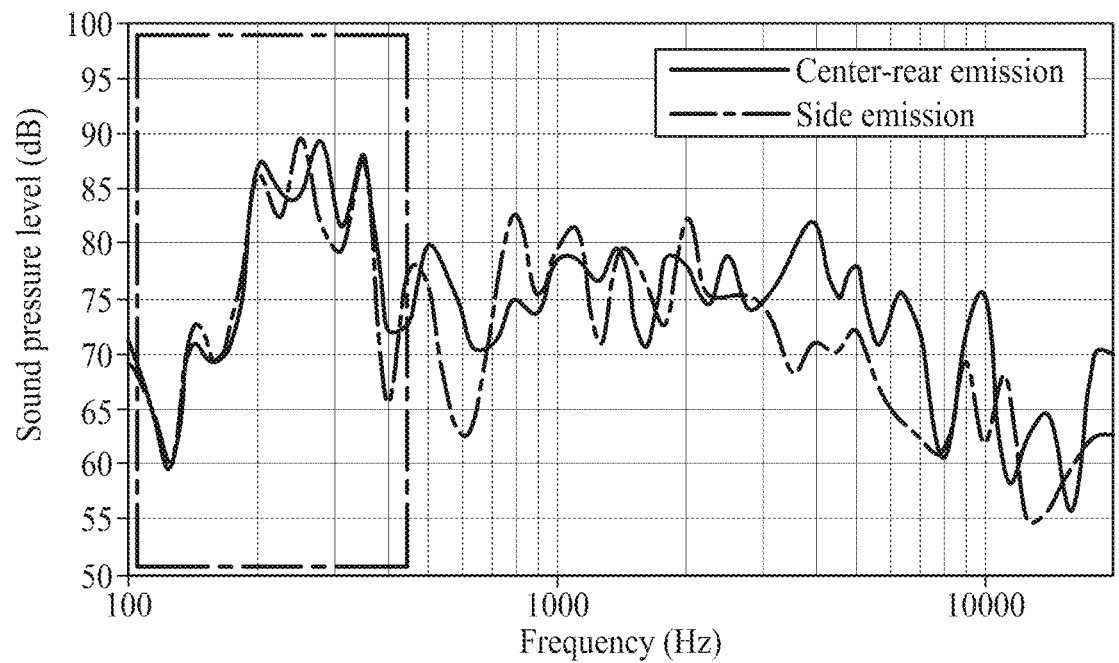
Figure 11C:
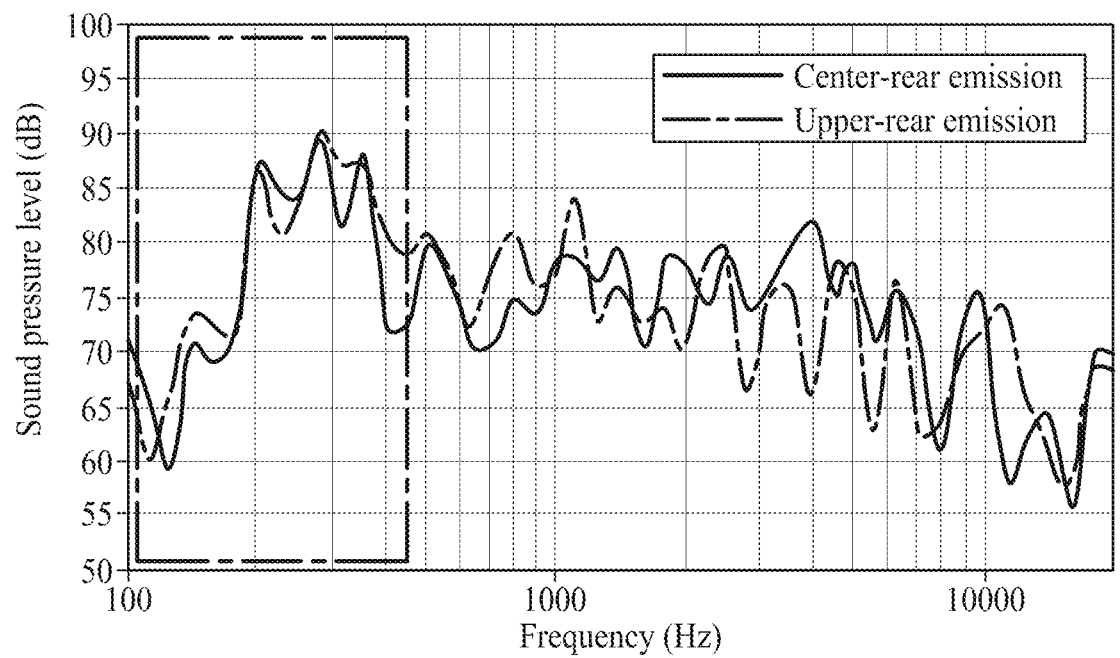

FIGS. 11A to 11C are graphs illustrating frequency-sound pressure characteristics according to experimental examples. In FIG. 11A to 11C, a horizontal axis denotes a frequency Hz, and a vertical axis denotes a sound pressure level (SPL) dB.

The experimental examples in FIGS. 11A to 11C illustrate frequency-sound pressure characteristics measured on the condition of a general space where reflection of a sound occurs, instead of an anechoic chamber, for a simulation test of an actual environment, wherein the frequency-sound pressure characteristics are measured through emission from a center to a front surface and a rear surface of the display panel, emission to the rear surface by spacing 40 cm from the center to an upper portion of the display panel and emission to the side by spacing 40 cm from the center to the side of the display panel after setting a plane where a full range speaker built in the same 65-inch TV as that in FIGS. 10A to 10C for experiments is spaced apart from a wall as much as 15 cm, to a virtual TV position. Since measurement conditions of FIGS. 11A to 11C are the same as those described in FIG. 9, additional description will be omitted to avoid repeated description.

In FIG. 11A, a solid line denotes emission (hereinafter, referred to as 'center-rear emission') from the center to the rear surface of the display panel, and a dashed dotted line denotes emission (hereinafter, referred to as 'center-front emission') from the center to the front surface of the display panel. As shown in FIG. 11A, it is noted from the center-front emission and the center-rear emission that sound pressure distribution of 500 Hz or less shown in a box becomes narrow and a sound is improved. It is also noted that there is no big difference between the center-front emission and the center-rear emission at sound characteristics and that the center-front emission indicates a more improved result than the center-rear emission in a sound pressure measurement value of 500 Hz or more due to narrow sound pressure distribution. In view of an envelope connecting the maximum values of frequency-sound pressure spectrums, the center-rear emission indicates more improved characteristics than the center-front emission. In case of comparison of frequency-sound pressure characteristics between FIG. 11A and FIG. 10A it is noted that there is no difference in characteristics of a low sound range between the center-front emission and the center-rear emission in an anechoic chamber but a sound of a low sound range is amplified through the center-rear emission in a simulation experiment of an actual environment.

In FIG. 11B, a solid line denotes a frequency-sound pressure characteristic of the center-rear emission, and a dashed dotted line denotes a measured result through emission (hereinafter, referred to as 'side emission') by spacing 40 cm from the center to the side of the display panel as described above. As shown in FIG. 11B, from a graph of a frequency-sound pressure of the center-rear emission in a sound characteristic of 500 Hz or less shown in a box, it is noted that deep is finely reduced as compared with a frequency-sound pressure graph of the side emission, and the center-rear emission is finely superior to the side emission in phase delay based on space. Also, in view of an envelope connecting the maximum values of frequency-sound pressure spectrums, the center-rear emission indicates a more improved characteristic than the center-front emission.

In FIG. 11C, a solid line denotes a frequency-sound pressure characteristic of the center-rear emission, and a dashed dotted line denotes a measured result through emission (hereinafter, referred to as 'upper-rear emission') by spacing 40 cm from the center to the upper portion of the display panel as described above. As shown in FIG. 11C, substantial sound characteristics including a sound characteristic of 500 Hz or less shown in a box cannot be observed in case of the center-rear emission and the upper-rear emission.

Figure 12A:
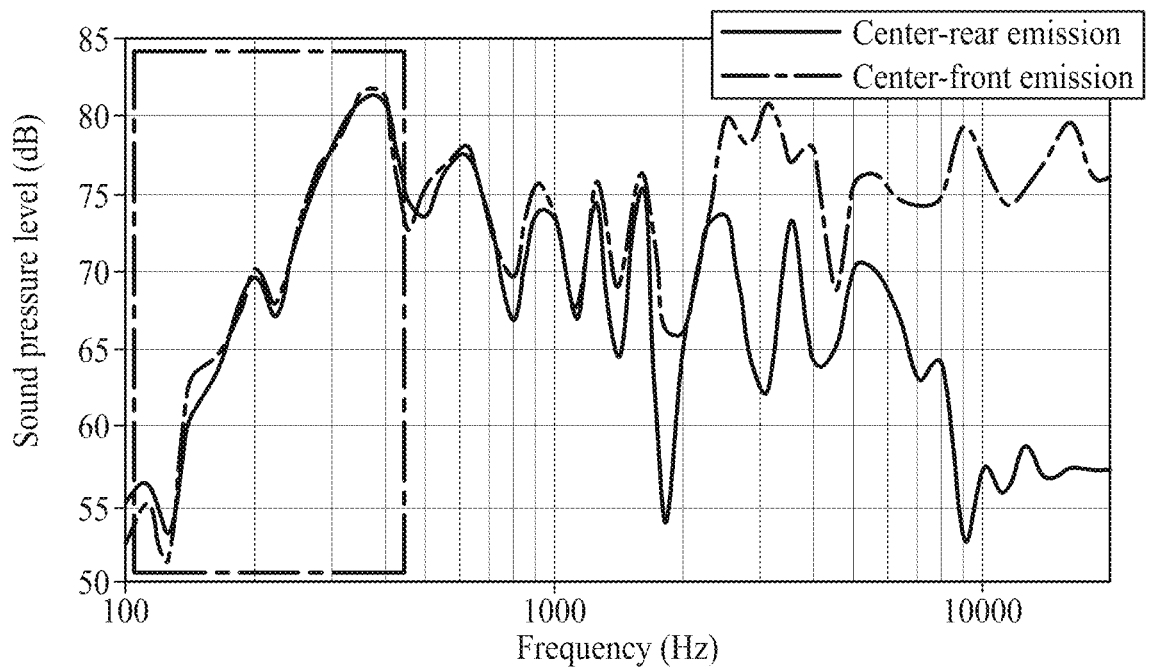
FIGS. 12A to 12C are graphs illustrating frequency-sound pressure characteristics according to experimental examples.
Figure 12B:
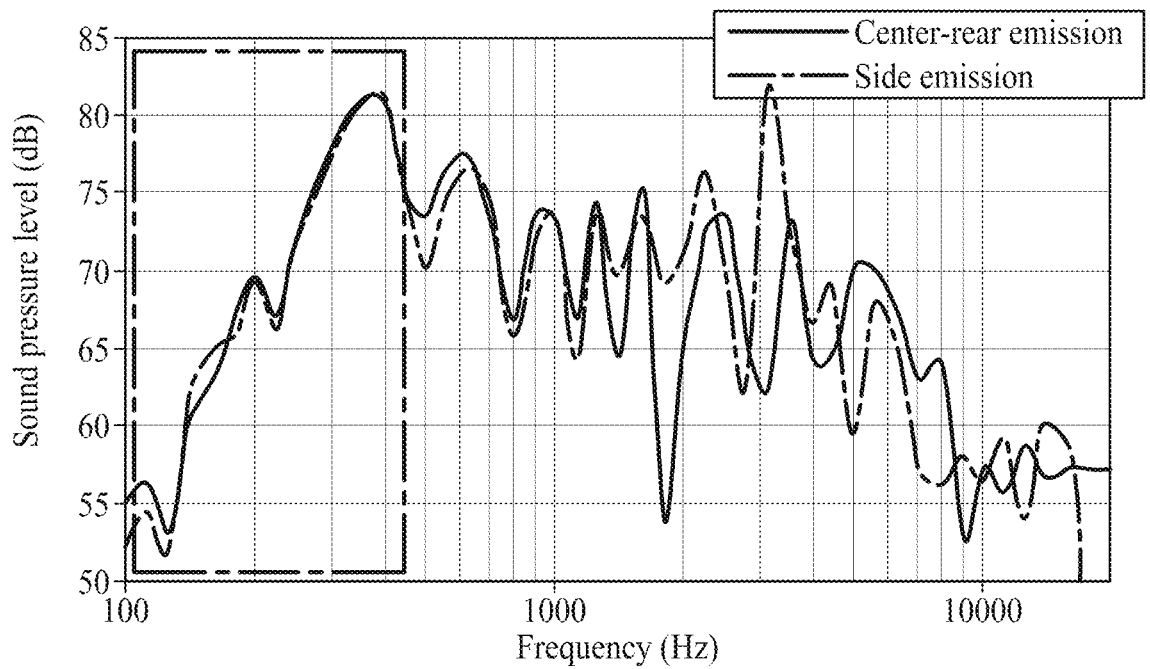
Figure 12C:
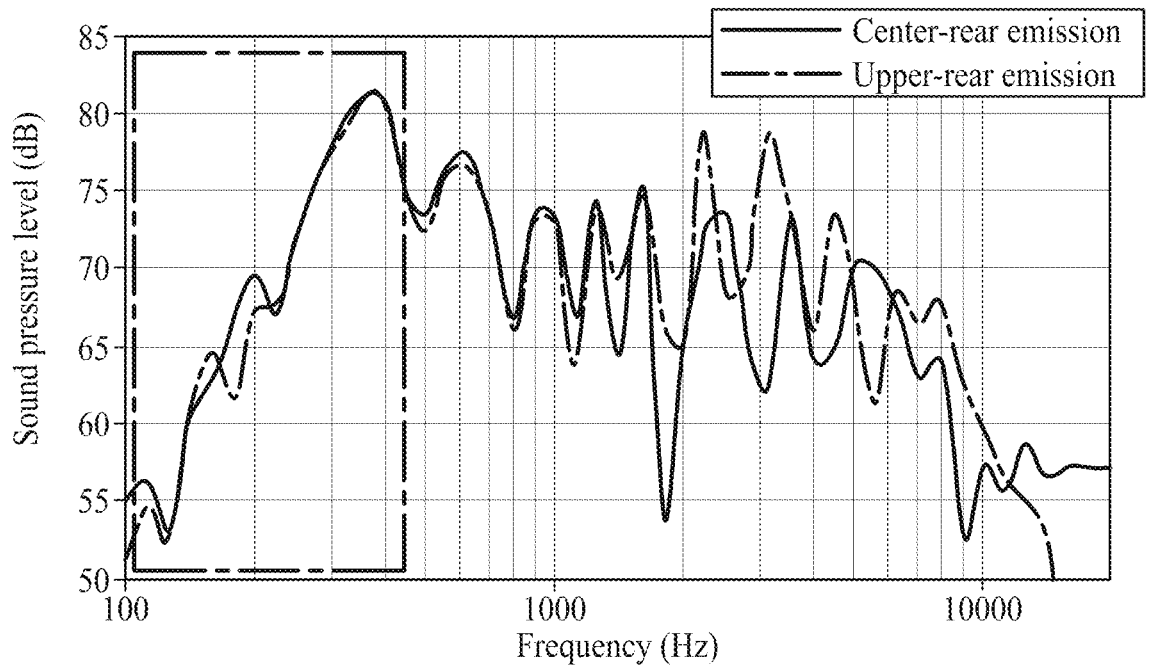
Figure 13A:
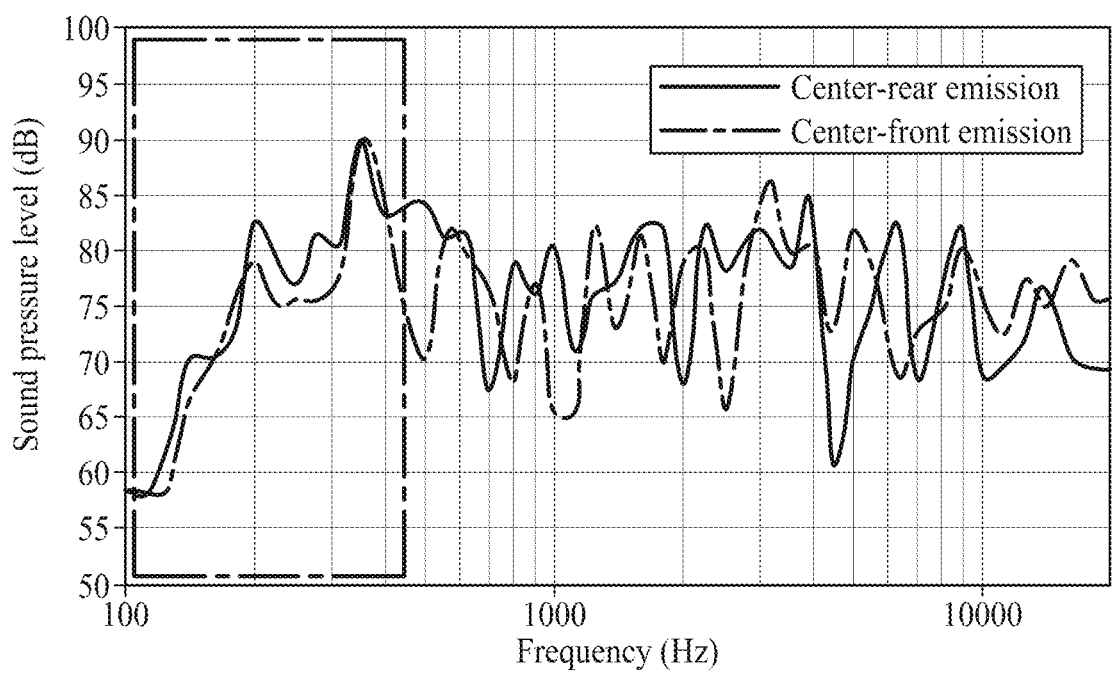
FIGS. 13A to 13C are graphs illustrating frequency-sound pressure characteristics according to experimental examples.
Figure 13B:
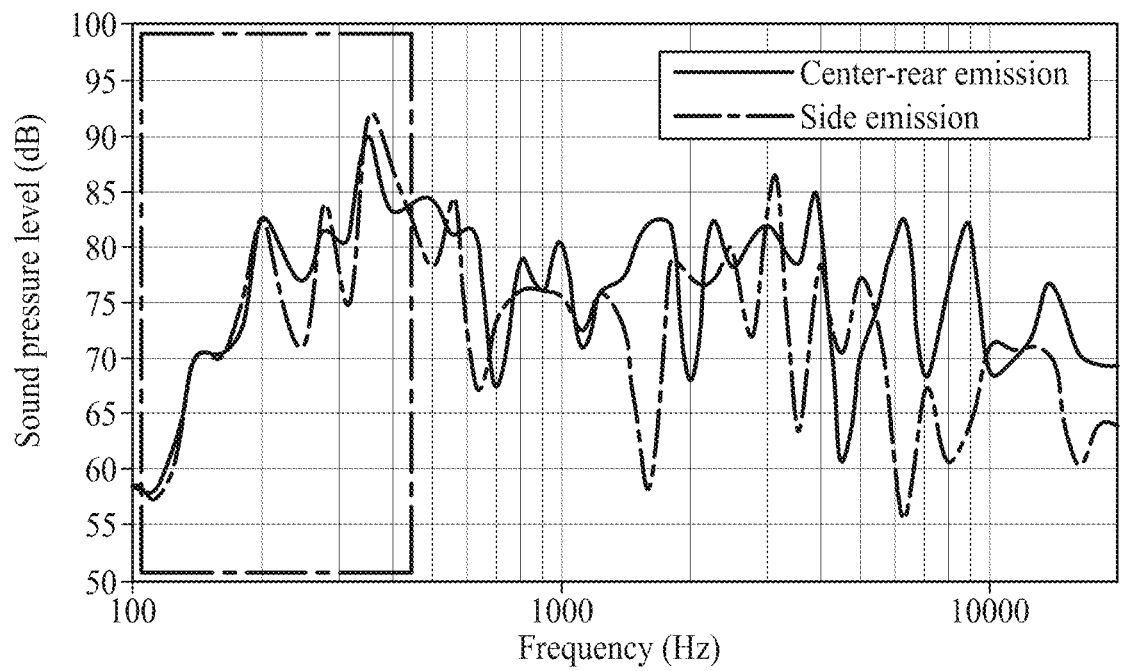
Figure 13C:
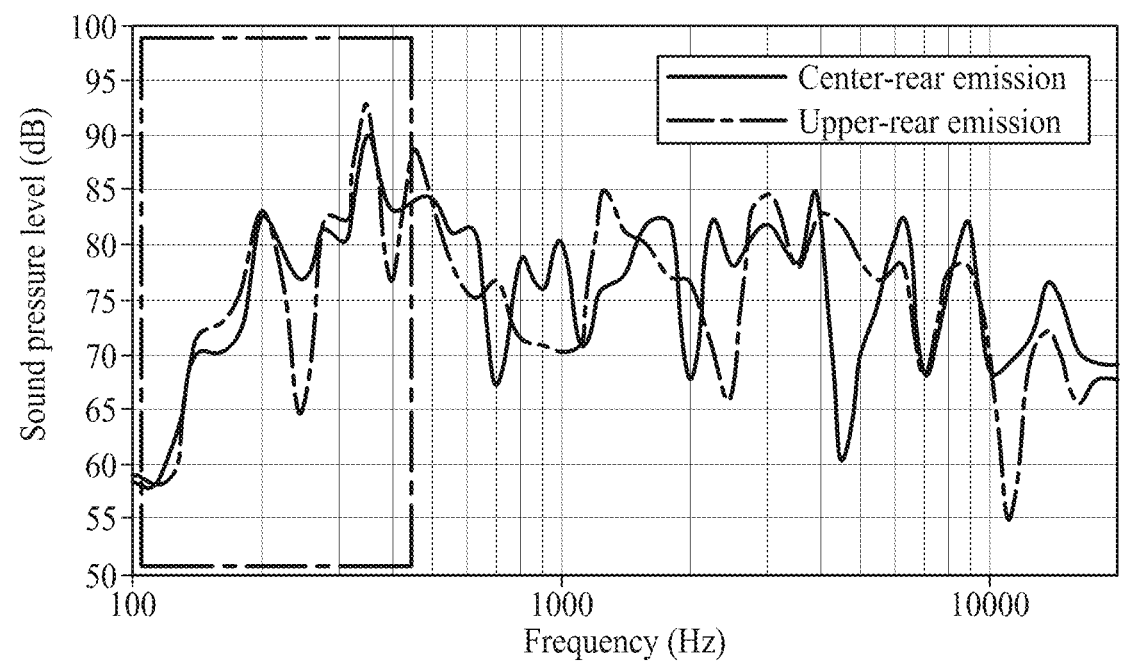

FIGS. 12A to 12C are graphs illustrating frequency-sound pressure characteristic according to experimental examples, and FIGS. 13A to 13C are graphs illustrating frequency-sound pressure characteristic according to experimental examples.

The experiments of FIGS. 12A to 12C and 13A to 13C have been performed under the same conditions as those of FIGS. 10A to 10C and 11A to 11C except that a speaker is built in another type of TV for experiments.

In FIG. 12A, a solid line denotes emission (hereinafter, referred to as 'center-rear emission') from the center to the rear surface of the display panel, and a dashed dotted line denotes emission (hereinafter, referred to as 'center-front emission') from the center to the front surface of the display panel. As shown in FIG. 12A, it is noted that there is no big difference between the center-front emission and the center-rear emission at sound characteristics of 500 Hz or less shown in a box and that the center-front emission indicates a more improved result than the center-rear emission in a sound pressure measurement value of 500 Hz or more.

In FIG. 12B, a solid line denotes a frequency-sound pressure characteristic of the center-rear emission, and a dashed dotted line denotes a measured result through emission (hereinafter, referred to as 'side emission') by spacing 40 cm from the center to the side of the display panel as described above. As shown in FIG. 12B, substantial sound characteristics including a sound characteristic of 500 Hz or less shown in a box cannot be observed in case of the center-rear emission and the side emission.

In FIG. 12C, a solid line denotes a frequency-sound pressure characteristic of the center-rear emission, and a dashed dotted line denotes a measured result through emission (hereinafter, referred to as 'upper-rear emission') by spacing 40 cm from the center to the upper portion of the display panel as described above. As shown in FIG. 12C, substantial sound characteristics including a sound characteristic of 500 Hz or less shown in a box cannot be observed in case of the center-rear emission and the upper-rear emission.

FIGS. 13A to 13C are graphs illustrating frequency-sound pressure characteristics according to experimental examples. In FIG. 13A to 13C, a horizontal axis denotes a frequency Hz, and a vertical axis denotes a sound pressure level (SPL) dB.

The experimental examples in FIGS. 13A to 13C illustrate frequency-sound pressure characteristics measured on the condition of a general space where reflection of a sound occurs, instead of an anechoic chamber, for a simulation test of an actual environment, wherein the frequency-sound pressure characteristics are measured through emission from a center to a front surface of the display panel, emission from the center to a rear surface of the display panel, emission to a rear surface by spacing 40 cm from the center to an upper portion of the display panel and emission to a side by spacing 40 cm from the center to the side of the display panel after setting a plane where a full range speaker built in the same 65-inch TV as that in FIGS. 10A to 10C for experiments is spaced apart from a wall as much as 15 cm, to a virtual TV position. Since measurement conditions of FIGS. 13A to 13C are the same as those described in FIG. 9, additional description will be omitted to avoid repeated description.

In FIG. 13A, a solid line denotes emission (hereinafter, referred to as 'center-rear emission') from the center to the rear surface of the display panel, and a dashed dotted line denotes emission (hereinafter, referred to as 'center-front emission') from the center to the front surface of the display panel. As shown in FIG. 13A, it is noted from the center-front emission and the center-rear emission that a sound pressure of 500 Hz or less shown in a box is improved. It is also noted that there is no big difference between the center-front emission and the center-rear emission at sound characteristics and that the center-front emission indicates a more improved result than the center-rear emission in a sound pressure measurement value of 500 Hz or more. In case of comparison of frequency-sound pressure characteristics between FIG. 13A and FIG. 12A, it is noted that there is no difference in characteristics of a low sound range between the center-front emission and the center-rear emission in an anechoic chamber but a sound of a low sound range is amplified through the center-rear emission in a simulation experiment of an actual environment.

In FIG. 13B, a solid line denotes a frequency-sound pressure characteristic of the center-rear emission, and a dashed dotted line denotes a measured result through emission (hereinafter, referred to as 'side emission') by spacing 40 cm from the center to the side of the display panel as described above. As shown in FIG. 13B, from a graph of a frequency-sound pressure of the center-rear emission in a sound characteristic of 500 Hz or less shown in a box, it is noted that deep is finely reduced as compared with a frequency-sound pressure graph of the side emission, and the center-rear emission is finely superior to the side emission in phase delay based on space.

In FIG. 13C, a solid line denotes a frequency-sound pressure characteristic of the center-rear emission, and a dashed dotted line denotes a measured result through emission (hereinafter, referred to as 'upper-rear emission') by spacing 40 cm from the center to the upper portion of the display panel as described above. As shown in FIG. 13C, substantial sound characteristics including a sound characteristic of 500 Hz or less shown in a box cannot be observed in case of the center-rear emission and the upper-rear emission.

The display apparatus according to the present disclosure may be described as follows.

A display apparatus according to the present disclosure comprises a display panel including a first area and a second area, a first rear cover disposed below a rear surface of the display panel, a first sound generating module arranged in the first area to adjoining the display panel, and a second sound generating module arranged in the second area to be spaced apart from the display panel, wherein the first rear cover includes a first rear cover port hole formed to overlap the second sound generating module, the second sound generating module includes an enclosure disposed below a rear surface of the first rear cover and coupled with the first rear cover, and a second sound generating unit mounted in the enclosure, and the enclosure includes an enclosure port hole overlapped with the first rear cover port hole.

According to some embodiments of the present disclosure, the first sound generating module may generate a sound by directly vibrating the display panel, and may output the sound to a front direction of the display panel.

According to some embodiments of the present disclosure, wherein the second sound generating module may generate a sound by vibrating a first resonance space which is an inner space of the enclosure, and may output the sound to a rear direction of the display panel.

According to some embodiments of the present disclosure, the first area may be a left area and a right area of the display panel, and the second area may be a center area of the display panel, which is not overlapped with the first area.

According to some embodiments of the present disclosure, the first area may be an upper area of the display panel, and the second area may be a lower area of the display panel, which is not overlapped with the first area.

According to some embodiments of the present disclosure, the upper area may include first to third upper areas, and the lower area may include first and second lower areas.

According to some embodiments of the present disclosure, a second resonance space may be formed in an area corresponding to the second area between the display panel and the first rear cover, and may be connected with the first resonance space.

According to some embodiments of the present disclosure, the sound generated by the second sound generating module may be amplified by connection between the first resonance space and the second resonance space.

According to some embodiments of the present disclosure, the first sound generating module and the second sound generating module may be arranged in one line.

According to some embodiments of the present disclosure, the display apparatus may further comprise a partition member partitioning the first area and the second area from each other.

According to some embodiments of the present disclosure, the enclosure may further include a duct formed at one side of the enclosure, and the duct may provide an additional path for outputting the sound generated by the second sound generating module.

According to some embodiments of the present disclosure, the display apparatus may further comprise a first buffering member formed below a rear surface of the first rear cover to correspond to the second sound generating unit.

According to some embodiments of the present disclosure, the display apparatus may further comprise a second rear cover for accommodating the first sound generating module and the second sound generating module.

According to some embodiments of the present disclosure, the second rear cover may include a fine hole formed in an area corresponding to the second sound generating unit, and the fine hole may provide a path through which the sound generated by the second sound generating unit is output.

According to some embodiments of the present disclosure, the display apparatus may further comprise a second buffering member formed in an area where the second sound generating module and the second rear cover are in contact with each other.

According to some embodiments of the present disclosure, the display apparatus may further comprise a support member arranged between the display panel and the first rear cover.

According to some embodiments of the present disclosure, the display apparatus may further comprise a third buffering member arranged between the support member and the first rear cover, and the third buffering member may prevent the sound generated by the second sound generating module from leaking.

It will be apparent to those skilled in the art that the present disclosure described above is not limited by the above-described embodiments and the accompanying drawings and that various substitutions, modifications, and variations can be made in the present disclosure without departing from the spirit or scope of the disclosures. Consequently, the scope of the present disclosure is defined by the accompanying claims, and it is intended that all variations or modifications derived from the meaning, scope, and equivalent concept of the claims fall within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

It will be apparent to those skilled in the art that various modifications and variations can be made in the display apparatus of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display apparatus, comprising:
a display panel including a first area and a second area;
a first rear cover disposed behind a rear surface of the display panel;
a first sound generating module arranged in the first area to adjoin the display panel; and
a second sound generating module arranged in the second area to be spaced apart from the display panel,
wherein the first rear cover includes a first rear cover port hole formed to overlap the second sound generating module,
the second sound generating module includes:
an enclosure disposed behind a rear surface of the first rear cover and coupled with the first rear cover; and
a second sound generating unit mounted in the enclosure, and
the enclosure includes an enclosure port hole overlapped with the first rear cover port hole.

2. The display apparatus of claim 1, wherein the first sound generating module generates a sound by directly vibrating the display panel, and outputs the sound to a front direction of the display panel.

3. The display apparatus of claim 1, wherein the first sound generating module adjoins the display panel by passing through the first rear cover.

4. The display apparatus of claim 1, wherein the second sound generating module generates a sound by vibrating a first resonance space which is an inner space of the enclosure, and outputs the sound to a rear direction of the display panel.

5. The display apparatus of claim 1, wherein the first area is a left area and a right area of the display panel, and the second area is a center area of the display panel, which is not overlapped with the first area.

6. The display apparatus of claim 1, wherein the first area is an upper area of the display panel, and the second area is a lower area of the display panel, which is not overlapped with the first area.

7. The display apparatus of claim 6, wherein the upper area includes first to third upper areas, and the lower area includes first and second lower areas.

8. The display apparatus of claim 1, wherein a second resonance space is formed in an area corresponding to the second area between the display panel and the first rear cover, and is communicated with the first resonance space through the first rear cover port hole and the enclosure port hole.

9. The display apparatus of claim 8, wherein the sound generated by the second sound generating module is amplified by the communication between the first resonance space and the second resonance space.

10. The display apparatus of claim 1, wherein the first sound generating module and the second sound generating module are arranged in one line.

11. The display apparatus of claim 1, further comprising a partition member partitioning the first area and the second area from each other.

12. The display apparatus of claim 1, wherein the enclosure further includes a duct formed at at least one side of the enclosure, and the duct provides an additional path for outputting the sound generated by the second sound generating module.

13. The display apparatus of claim 1, further comprising a first buffering member formed behind a rear surface of the first rear cover to correspond to the second sound generating unit.

14. The display apparatus of claim 13, wherein the first buffering member is formed to replace a portion of the enclosure corresponding to the second sound generating unit.

15. The display apparatus of claim 1, further comprising a second rear cover for accommodating the first sound generating module and the second sound generating module.

16. The display apparatus of claim 15, wherein the second rear cover includes a fine hole formed in an area corresponding to the second sound generating unit, and the fine hole provides a path through which the sound generated by the second sound generating unit is output.

17. The display apparatus of claim 15, further comprising a second buffering member formed in an area where the second sound generating module and the second rear cover are in contact with each other.

18. The display apparatus of claim 1, further comprising a support member arranged between the display panel and the first rear cover.

19. The display apparatus of claim 18, further comprising a third buffering member arranged between the support member and the first rear cover, and the third buffering member prevents the sound generated by the second sound generating module from leaking.

20. The display apparatus of claim 1, wherein the second sound generating unit has a same structure with that of the first sound generating module but is provided reversely, and
    the second sound generating unit is provided with a vibration panel separated from the display panel.

* * * * *